A. D. ROBBINS.
CYCLE DESIGNED FOR STAGE PURPOSES.
APPLICATION FILED OCT. 21, 1909.
985,369.
Patented Feb. 28, 1911.
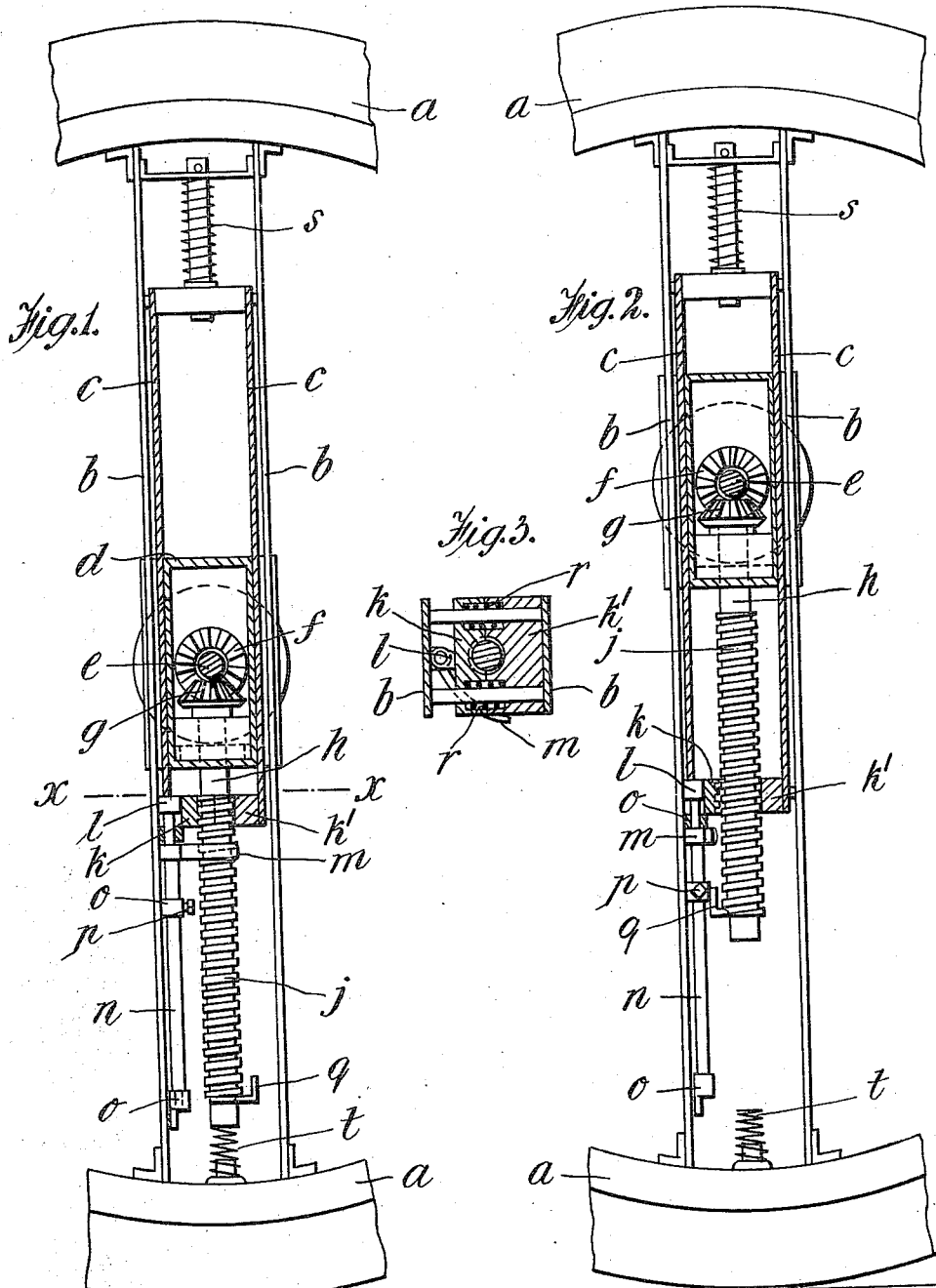
Witnesses
Emory L. Goff
R. C. Braddock
Inventor.
Arthur D. Robbins
By S. T. Wolhaupter
His attorney.

UNITED STATES PATENT OFFICE.

ARTHUR DELORAN ROBBINS, OF LONDON, ENGLAND.

CYCLE DESIGNED FOR STAGE PURPOSES.

985,369.  Specification of Letters Patent.  Patented Feb. 28, 1911.

Application filed October 21, 1909. Serial No. 523,887.

*To all whom it may concern:*

Be it known that I, ARTHUR DELORAN ROBBINS, a subject of the King of Great Britain and Ireland, and resident of London, county of London, England, have invented certain new and useful Improvements in and Relating to Cycles Designed for Stage Purposes, of which the following is a specification.

This invention relates to cycles for stage purposes and to that type in which the axle of the wheel can be shifted away from the center to produce an upward and downward movement of the frame, and the present invention has for its object the improved construction and arrangement of device whereby a gradually and varying eccentricity is given to the axle till such time as a catch or the like is released, whereupon the axle is either left free during the rotation of the wheel to move freely in a vertical direction or is brought automatically and gradually back to its central position. Further, by fitting the improved device to both wheels of the cycle there can be imparted to the frame an up and down or see-saw movement.

With these objects in view the said invention consists essentially in the provision of a screw operated by suitable gear during the rotation of the wheel to cause the axle box to move away from or to the center, this being effected by the engagement of the aforesaid screw with a nut carried by or secured to the transverse stays of the wheel.

For a clear understanding of the present invention reference is to be had to the following description and accompanying sheets of drawings in which:—

Figure 4:
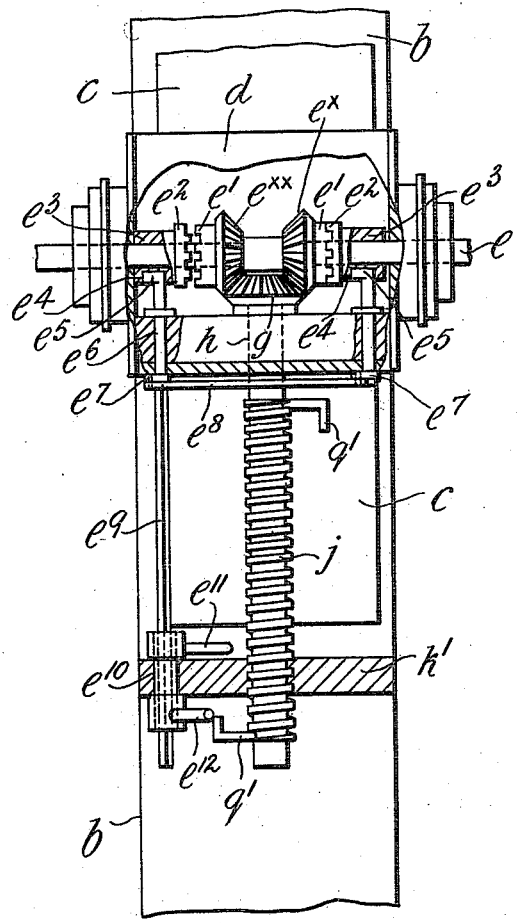
Figure 5:
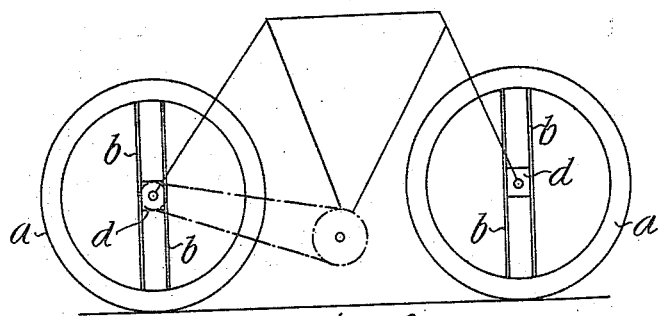
Figure 6:
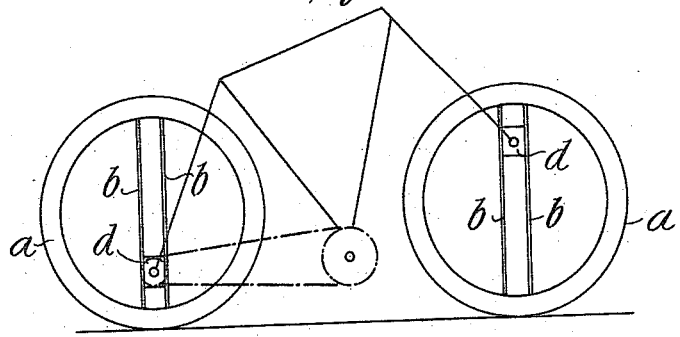
Figure 7:
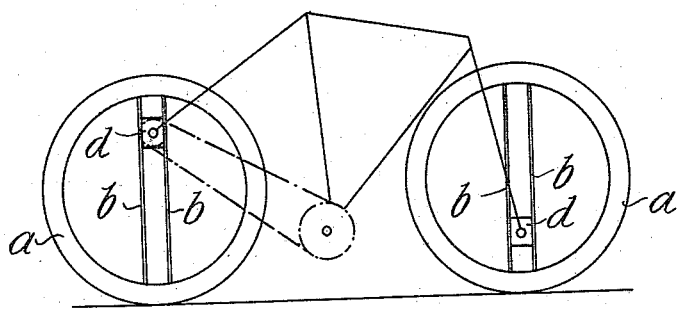

Figure 1 is a view partly in section, the axle of the wheel in its central position. Fig. 2 is a similar view but with axle eccentric, freed and ready to fall. Fig. 3 is a horizontal section on line $x, x$ Fig. 1. Fig. 4 is a transverse section showing mechanism to effect the automatic return of the axle; and, Figs. 5, 6 and 7 illustrate various positions the frame may take.

In said drawings, $a$—Figs. 1 and 2—represents the wheel and $b, b$ transverse stays to which are secured the slides $c, c$ which receive the slidable axle box $d$. On the axle $e$ is arranged a bevel wheel $f$ meshing with the bevel $g$ carried by shaft $h$ which works in suitable bearings in the axle box. This shaft $h$ for the greater part of its length is screw threaded as at $j$ to engage with the half nut $k$ under the action of the cam head $l$ when the tail or finger piece $m$ thereof is turned into the position shown in Figs. 1 and 3. This cam head $l$ is carried by a spindle $n$ pivotally mounted in bearings $o$ on one of the stays $b$ and is provided with a stud $p$ adjustably secured thereon. On the lower end of the screwed shaft $h$ is secured a tappet $q$ which, when the axle box and with it the screwed shaft has moved to the predetermined distance from the center of the wheel, comes into engagement with the stud $p$ and throws the same over and with it the spindle $n$ bringing the cam head out of engagement with the half nut $k$ which immediately under the action of the springs $r$ is moved out of engagement with the screw threaded shaft—see Fig. 2—leaving the same free, the other part $k'$ of the nut being plain. In this position—Fig. 2—it will be seen that the axle box is free to fall and to slide to and fro in the slides $c$ during the rotation of the wheel, the shock of the fall being taken up by springs $s$ and $t$, the spring $t$ serving, when the device is in the position Fig. 1, to keep the screw well up to its work to insure the proper engagement of the nut $k$. To re-set the device it is only necessary to bring the axle box to its central position and swing around the tail piece $m$ causing the nut to again engage the screw. If desired, the axle box may be provided with an arm adapted when the axle box falls to engage with the finger or tail piece $m$ and move the same over so as to reëngage the nut with the screw.

In some cases the screw $j$ may be located exterior of the axle box and be driven by any suitable gear on the hub of the axle box.

If desired, means such as clutches may be provided, operable by the rider, whereby he can disconnect the gear on the axle so that the wheel may be rotated without actuating the screw.

In Fig. 4 is illustrated the manner in which the axle is automatically and gradually returned to its central position and consists essentially in loosely mounting on the axle $e$ a pair of bevel wheels $e^x, e^{xx}$, the same being in constant mesh with the bevel $g$ on the screwed shaft $h$ and in providing means whereby one or other of said bevels $e^x, e^{xx}$ may be locked to the axle $e$ to effect the rotation of the screwed shaft in opposite directions. For this purpose said means may consist in providing the bevels $e^x, e^{xx}$ with clutch faces $e'$ adapted to be engaged with by clutch faces $e^2$ on sliding but not rotatable pieces $e^3$ on axle $e$. In these pieces $e^3$ are formed cam grooves $e^4$ oppositely arranged into which take cams $e^5$ on the ends of the spindles $e^6$, carried by the axle box $d$, provided with arms $e^7$ connected together by link $e^8$ so that said spindles may turn together. The lower part $e^9$ of said spindles $e^6$ is formed square and passes through a sleeve $e^{10}$ rotatably mounted in the nut $k'$, said sleeve $e^{10}$ being provided with fingers $e^{11}$, $e^{12}$ arranged one on either side of the nut $k'$ to be engaged with by the tappets $q$, $q'$ on the screw threaded shaft $h$. The position shown is that in which the axle $e$ has reached its greatest eccentric position, the tappet $q$ having thrown over the finger $e^{12}$, disengaging the clutch faces $e^2$, $e'$, leaving bevel $e^{xx}$ free to rotate, and engaging clutch faces $e^2$, $e'$, locking bevel $e^x$ to the shaft $e$ so that on the rotation of the wheel $a$ the screw shaft is rotated in the opposite direction, bringing the axle box toward the center of the wheel till such time as the tappet $q'$ throws over the finger $e^{11}$, disengaging bevel $e^x$ and locking bevel $e^{xx}$.

In Figs. 5 to 7 is shown how, by fitting the device to both wheels of the cycle, the frame can have imparted to it an up and down or see-saw motion, Fig. 5 illustrating axles of both wheels central therewith, Fig. 6 showing rear axle at its lowermost eccentric position and front axle at its uppermost eccentric position, and Fig. 7 rear axle at its uppermost eccentric position and front axle at its lowermost eccentric position.

Having now described my invention, what I claim as new and desire to secure by Letters Patent of the United States is:—

1. In a trick cycle, the combination with a plurality of wheels respectively having transverse guides, of an axle movably mounted in each of said guides, a frame supported by the axles, means for imparting a see-saw motion to the frame by varying the eccentric positions of the said axles, and means for automatically releasing the axles at their extreme outer positions to permit of the same to automatically return to their normal positions.

2. In trick cycles to which an upward and downward or see-saw motion is imparted, the combination with the transverse stays, slide bars and slidable axle box of a gear mounted on the axle or hub of the axle, a screw threaded shaft carried by the axle box, a gear on said screw threaded shaft engaging with the gear on the axle, a split nut carried by the transverse stays to engage said screw threaded shaft, a cam headed spindle, an adjustable stop on said spindle adapted to co-act with a tappet on the screw threaded rod to effect the disengagement of the nut with the screw threaded rod substantially as described.

3. In a trick cycle, the combination with a plurality of wheels respectively having transverse guides, of an axle movably mounted in each of said guides, a frame supported by the axles, means for imparting a see-saw motion to the frame by gradually varying the eccentric positions of the said axles, and means for automatically effecting the gradual varying eccentric positions of the axles in a reverse direction.

4. In trick cycles to which an upward and downward or see-saw motion is imparted, the combination with the transverse stays, slide bars and slidable axle box of a screw threaded shaft carried by the axle box, a nut carried by the transverse stays engaging said screw, a gear carried by said screw, oppositely arranged gears loosely mounted on the wheel axle but in constant mesh with the aforesaid gear on the screwed shaft and means for automatically locking one or other of the gears on the axle to effect the rotation of the screw threaded shaft in either direction to cause the gradually varying eccentric position of the axle.

In testimony whereof I have affixed my signature.

ARTHUR DELORAN ROBBINS.

Witnesses:
   ROBT. HUNTER,
   H. BUBB.